US008958098B2

(12) United States Patent
Sato (10) Patent No.: US 8,958,098 B2
(45) Date of Patent: Feb. 17, 2015

(54) COMMUNICATION DEVICE ALLOWING PROXY RECEPTION OF DATA DIRECTED THERETO, AND CONTROL METHOD AND STORAGE MEDIUM THEREFOR

(71) Applicant: Canon Kabushiki Kaisha, Tokyo (JP)

(72) Inventor: Haruki Sato, Tokyo (JP)

(73) Assignee: Canon Kabushiki Kaisha (JP)

( * ) Notice: Subject to any disclaimer, the term of this patent is extended or adjusted under 35 U.S.C. 154(b) by 45 days.

(21) Appl. No.: 13/753,068

(22) Filed: Jan. 29, 2013

(65) Prior Publication Data
US 2013/0215442 A1 Aug. 22, 2013

(30) Foreign Application Priority Data

Feb. 16, 2012 (JP) .................................. 2012-031569

(51) Int. Cl.
G06F 3/12 (2006.01)
H04N 1/00 (2006.01)
H04N 1/32 (2006.01)

(52) U.S. Cl.
CPC ....... *H04N 1/00302* (2013.01); *H04N 1/00217* (2013.01); *H04N 1/00244* (2013.01); *H04N 1/32432* (2013.01); *H04N 2201/0093* (2013.01)
USPC ....... 358/1.15; 358/1.13; 358/1.14; 358/1.16; 358/400; 358/403; 358/407; 358/434; 358/438; 358/442; 709/219; 709/238; 370/352

(58) Field of Classification Search
None
See application file for complete search history.

(56) References Cited

U.S. PATENT DOCUMENTS

| 8,310,703 | B2* | 11/2012 | Nuggehalli et al. | 358/1.15 |
| 2007/0271384 | A1* | 11/2007 | Zmudzinski et al. | 709/227 |
| 2008/0151296 | A1* | 6/2008 | Watanabe | 358/1.15 |
| 2008/0247384 | A1* | 10/2008 | Arauz-Rosado et al. | 370/352 |
| 2009/0144360 | A1* | 6/2009 | Wada | 709/203 |
| 2010/0040049 | A1* | 2/2010 | Benedyk et al. | 370/352 |
| 2010/0214593 | A1* | 8/2010 | Toda | 358/1.14 |
| 2010/0259788 | A1* | 10/2010 | Sakuda et al. | 358/1.15 |

FOREIGN PATENT DOCUMENTS

JP 2010-193359 A 9/2010

OTHER PUBLICATIONS

Rosenburg, et al.; "SIP: Session Initiation Protocol"; The Internet Society 2002; pp. 1-240; http://www.ietf.org/rfc/rfc3261.txt. (RFC 3261).

* cited by examiner

*Primary Examiner* — Miya J Cato
(74) *Attorney, Agent, or Firm* — Rossi, Kimms & McDowell LLP

(57) ABSTRACT

A communication device that allows a proxy reception device to perform proxy reception of data directed to the communication device. The communication device establishes a SIP protocol-based session through a call controller connected to a network and performs data communication. The communication device holds proxy reception device destination information representing an IP address of the proxy reception device that performs proxy reception of data transmitted to a SIP URI of the communication device, and registers, into the call controller, registration information comprised of communication device destination information and proxy reception device destination information according to which the communication device sends proxy reception instruction information that instructs to perform proxy reception to the proxy reception device.

10 Claims, 10 Drawing Sheets

| PROXY RECEPTION DESTINATION | PRINTING NECESSITY/ UNNECESSITY SETTING |
|---|---|
| 192.168.1.2 | NECESSITY OF PRINTING |

| NO. | SIP URI OF PROXY REQUEST DEVICE | PRINTING NECESSITY/ UNNECESSITY SETTING INFORMATION |
|---|---|---|
| 1 | sip:101@abc.com | NECESSITY OF PRINTING |
| 2 | sip:106@abc.com | UNNECESSITY OF PRINTING |

```
request_type = altarnate receive start
intended_sip_uri = sip:101@abc.com
print = yes
```

FIG. 10

| NO. | SIP URI | IP ADDRESS |
|---|---|---|
| 1 | sip:101@abc.com | 192.168.1.1 |
| 2 | sip:102@abc.com | 192.168.1.2 |

FIG. 11

```
request_type = altarnate receive end
intended_sip_uri = sip:101@abc.com
```

FIG. 12

```
request_type = transfer
intended_sip_uri = sip:101@abc.com
forwarding_sip_uri = sip:101@abc.com
```

COMMUNICATION DEVICE ALLOWING PROXY RECEPTION OF DATA DIRECTED THERETO, AND CONTROL METHOD AND STORAGE MEDIUM THEREFOR

BACKGROUND OF THE INVENTION

1. Field of the Invention

The present invention relates to a communication device that allows a proxy reception device to perform proxy reception of data directed to the communication device, and relates to a control method for the communication device and a storage medium storing a program for executing the control method.

2. Description of the Related Art

As a protocol to establish a virtual session with a communication device connected to a network, a SIP (session initiation protocol) is stipulated in RFC 3261 and utilized for communication services such as IP (Internet protocol) telephone and IP-FAX.

To reduce power consumption, some communication device is configured to shift from a standby state to a sleep state upon elapse of a predetermined period of time in which the device remains in a non-operating state.

In IP-FAX, as with the case of conventional facsimile communication, a sender communication device originates a call, while specifying a receiver communication device as a destination. The receiver communication device, even if configured to shift to a sleep state, can immediately respond to an incoming call when it is in an operating state or in a standby state at the time of reception of the incoming call, but must be returned to the standby state when it is in the sleep state at that time.

Accordingly, there has been proposed a management device that transfers IP-FAX whose destination is a communication device which is in the sleep state to another communication device selected from among communication devices which are not in the sleep state, and allows the selected device to perform proxy reception (see, for example, Japanese Laid-open Patent Publication No. 2010-193359).

In the proposed management device, an identification information (e.g., device ID) of the communication device selected as the proxy reception device from among communication devices is registered into a SIP server. To this end, pieces of identification information of all the communication devices managed by the management device must be held in advance in the management device.

Instead of selecting the proxy reception device from among communication devices by the management device, it appears possible that a SIP URI (uniform resource identifier) of the communication device and an IP address of a destination (proxy reception device) to which a SIP session establishment request message (INVITE message) directed to the communication device is to be routed can be registered in association with each other into a SIP server by a communication device at the time of being shifted to the sleep state.

In that case, the INVITE message directed to the SIP URI of the communication device shifted to the sleep state is routed by the SIP server to the proxy reception device, and IP-FAX can be received by the proxy reception device, if the proxy reception device responds to the INVITE message and establishes a SIP session.

However, since the INVITE message is directed to a SIP URI other than that of the proxy reception device, the proxy reception device refuses to establish the SIP session. In other words, proxy reception of IP-FAX cannot be carried out by the technique where the communication device registers, into the SIP server, the destination to which the INVITE message directed to the communication device is to be routed.

SUMMARY OF THE INVENTION

The present invention provides a communication device that allows a proxy reception device to perform proxy reception of data directed to the communication device, and provides a control method for the communication device and a storage medium storing a program for executing the control method.

According to one aspect of this invention, there is provided a communication device that allows proxy reception of data directed to the communication device to be performed through a call controller that is connected to a network, comprising a first holding unit configured to hold at least proxy reception device destination information that represents a destination of a proxy reception device connected to the network and configured to receive on behalf of the communication device data that is transmitted to a destination of the communication device, a registration unit configured to register, into the call controller, registration information that is comprised of communication device destination information representing the destination of the communication device and the proxy reception device destination information associated therewith, and a proxy reception instruction unit configured to send to the proxy reception device, according to the proxy reception device destination information acquired from the first holding unit, proxy reception instruction information that instructs the proxy reception device to perform proxy reception.

With this invention, the registration information by which the communication device and the proxy reception device are associated with each other is registered in the call controller by the communication device and the proxy reception instruction is notified to the proxy reception device according to the registration information, whereby proxy reception of data directed to the communication device can be performed by the proxy reception device.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1:
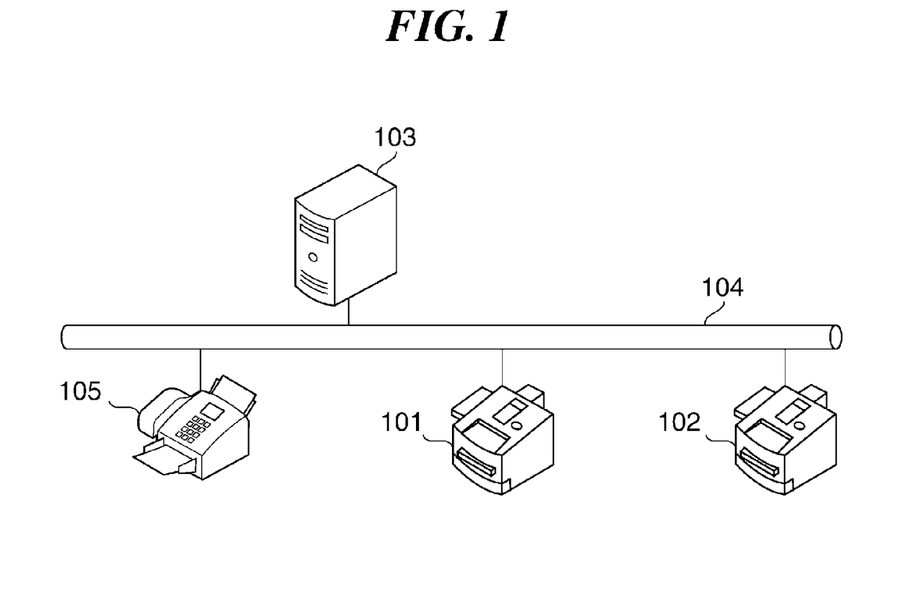
FIG. 1 is a view showing a network structure that includes a proxy request device and a proxy reception device respectively constituted by image forming apparatuses, which are an example of communication devices according to one embodiment of this invention, and that includes a call control server and a FAX.

FIG. 1 shows a network structure that includes image forming apparatuses, which are an example of communication devices according to one embodiment of this invention.

As show in FIG. 1, image forming apparatuses 101, 102, a call control server (call controller) 103, and a facsimile apparatus (hereinafter, simply referred to as the FAX) 105 are connected to a network 104. It should be noted that the number of image forming apparatuses and the number of FAXes that can be connected to the network 104 are not limitative.

The image forming apparatuses 101, 102 each have an IP-FAX function (i.e., data communication function) and functions of copy, print, scan, etc. The FAX 105 has an IP-FAX function.

The network 104 is controlled by IP (Internet protocol). By the IP-FAX function, the image forming apparatuses 101, 102 and the FAX 105 each perform IP-FAX communication (data communication) according to T.38 protocol specified in the ITU-T recommendation.

The image forming apparatuses 101, 102 and the FAX 105 each have a SIP (session initiation protocol) function. The call control server 103 performs SIP-based call control (also called session control). In the call control, the image forming apparatuses 101, 102 and the FAX 105 (user agent) are distinguished from one another based on SIP URIs, so that communication can be performed without concern for IP address of the transmission destination.

The image forming apparatus 101 operates to cause the image forming apparatus 102 to perform proxy reception of IP-FAX directed to the image forming apparatus 101, and the image forming apparatus 102 operates to perform proxy reception of IP-FAX directed to the image forming apparatus 101. In the following, the image forming apparatuses 101, 102 will be sometimes referred to as the proxy request device and the proxy reception device, respectively.

It should be noted that in this embodiment, the image forming apparatus 101 has a SIP URI of sip:101@abc.com and an IP address of 192.168.1.1, and the image forming apparatus 102 has a SIP URI of sip:102@abc.com and an IP address of 192.168.1.2.

Figure 2:
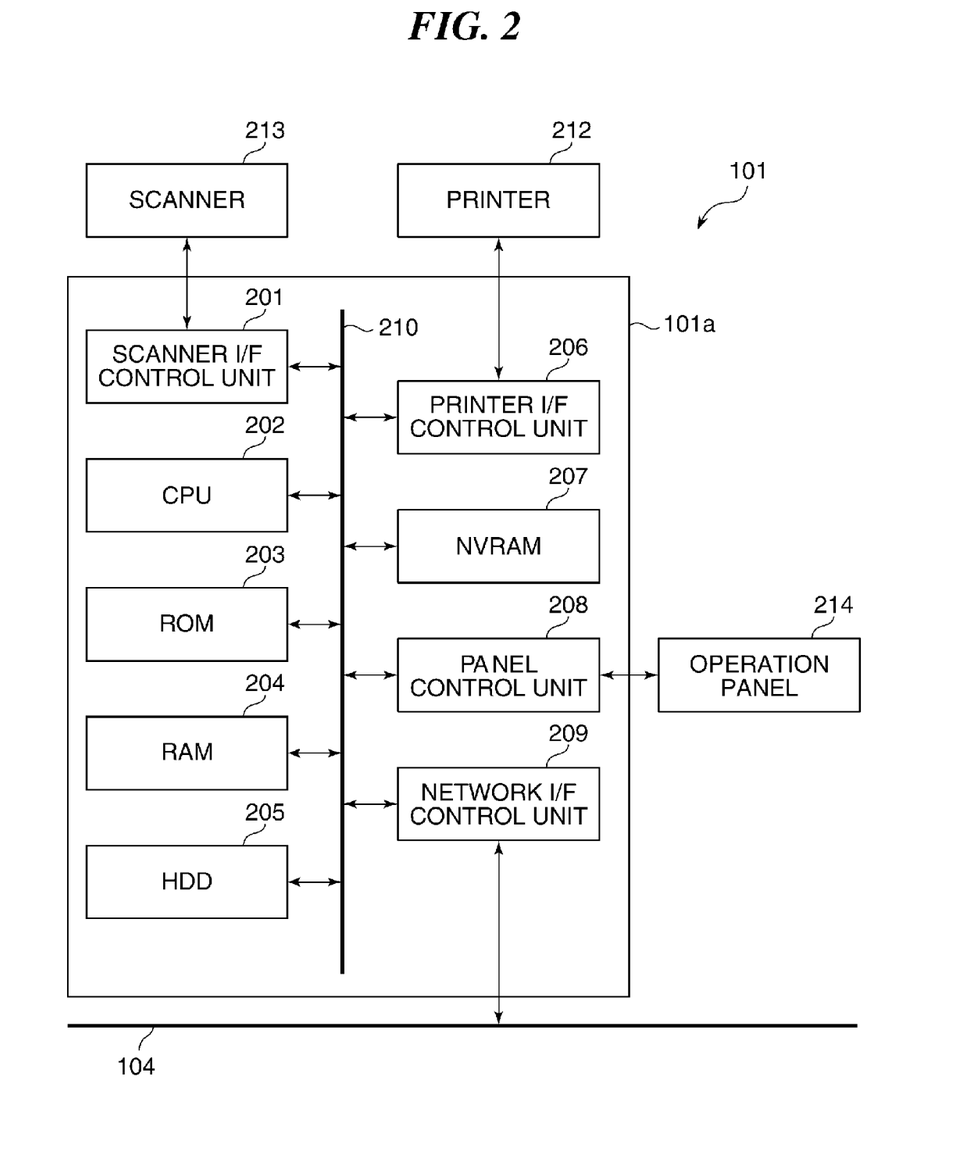
FIG. 2 is a block diagram showing an example hardware structure of one of the image forming apparatuses.

FIG. 2 shows in block diagram an example hardware structure of the image forming apparatus 101. It should be noted that the image forming apparatus 102 has the same hardware structure as that of the image forming apparatus 101.

As shown in FIG. 2, the image forming apparatus 101 includes a control unit 101a, a scanner 213 that optically reads an image of an original and outputs image data, and a printer 212 that forms an image on a recording sheet based on the image data under the control of the control unit 101a.

The control unit 101a includes a scanner I/F control unit 201 that controls the scanner 213. A CPU 202 controls the image forming apparatus 101 by executing a control program or an application program. A ROM 203 is stored with the control program executed by the CPU 202, etc.

A RAM 204 is used by the CPU 202 as a main memory and a work area, and also used as a BOX data storage area in which image data read by the scanner 213 is held as BOX data, which can be referred to through the network 104. The memory capacity of the RAM 204 can be expanded by connecting an option RAM to an expansion port (not shown).

A HDD (hard disk drive) 205 is stored with, e.g., application program, print data (image data), font data, and form data, and used as a job storage area stored with a spooled print job so as to be capable of being externally referred to.

A printer I/F control unit 206 controls the printer 212. A NVRAM (nonvolatile memory) 207 is stored with various setting values for the image forming apparatus 101. A panel control unit 208 controls an operation panel 214 so as to cause the operation panel 214 to display various information and to accept a user's instruction input through the operation panel 214. A network I/F control unit 209 controls transmission and reception of data (e.g., facsimile data) to and from the network 104.

The structural elements 201 to 209 of the control unit 101a are connected to one another through a bus 210. It should be noted that an external storage device such as a SD card or a flash memory can be provided instead of the HDD 205.

Figure 3:
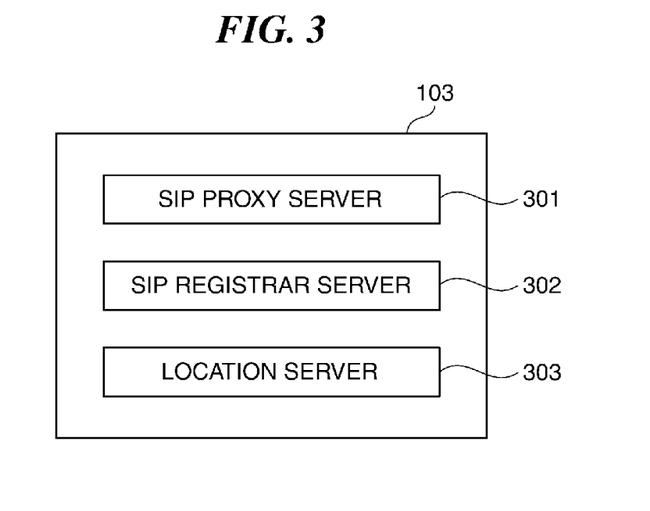
FIG. 3 is a view showing an example construction of the call control server.

FIG. 3 shows an example construction of the call control server 103.

As shown in FIG. 3, the call control server 103 includes a SIP proxy server 301, SIP registrar sever 302, and location server 303.

The SIP proxy server 301 transfers a SIP message according to SIP RFC 3261. In other words, the SIP proxy server 301 relays a SIP request from a user agent client to another user agent server. For example, by using as a key a transmission destination address contained in a SIP header, the SIP proxy server 301 makes an inquiry to the location server 303 to acquire an IP address of the transmission destination, and based on the acquired IP address, determines the transfer destination of the SIP message.

The SIP registrar sever 302 acquires from the SIP message sent from each user agent client a pair of SIP URI and IP address of the user agent client according to SIP RFC 3261, and registers the acquired URI and address pair.

The location server 303 manages pairs of the SIP URI and IP address of user agent clients. For example, the location server 303 receives pairs of IP address and SIP URI from the SIP registrar sever 302 and registers the acquired pairs as registration information, and based on the registration information, responds to an inquiry from the SIP proxy server 301. In this example, a pair of SIP URI (communication device destination information) and IP address of the proxy request device 101 and a pair of SIP URI and IP address of the proxy reception device 102 are registered in the location server 303 (see FIG. 10).

Figure 4:
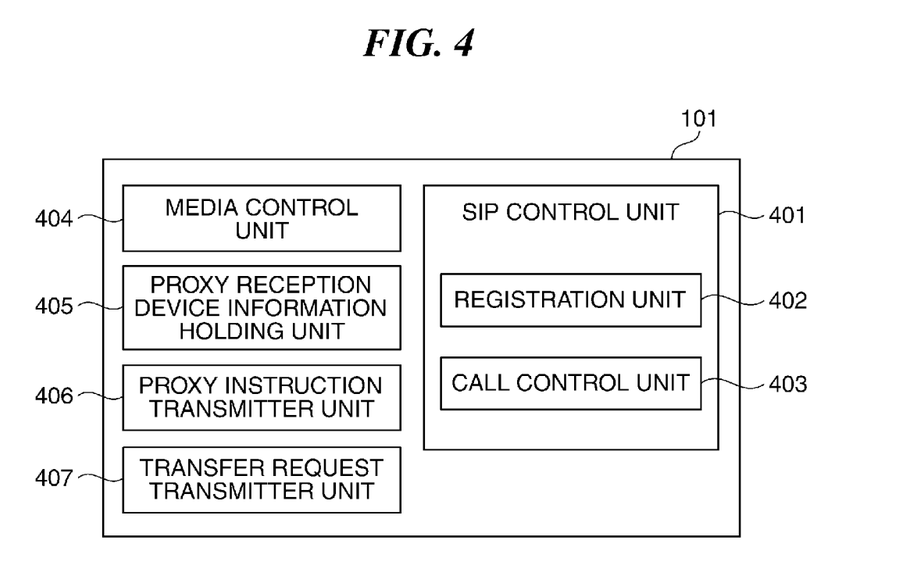
FIG. 4 is a functional block diagram showing a software structure of the proxy request device.

FIG. 4 shows in functional block diagram a software structure of the proxy request device 101.

As shown in FIG. 4, the proxy request device 101 includes a SIP control unit 401, media control unit 404, proxy reception device information holding unit 405, proxy instruction transmitter unit 406, and transfer request transmitter unit 407. These elements 401 and 404 to 407 operate on the CPU 202 of the image forming apparatus.

The SIP control unit 401 includes a registration unit 402 that registers pairs of SIP URI and IP address into the call control server 103, and a call control unit 403 that controls a SIP session for IP-FAX.

The media control unit 404 controls transmission and reception of media data in IP-FAX, and where required, controls printing. The proxy reception device information holding unit 405 (first holding unit) holds information associated with the proxy reception device 102 that performs proxy reception of IP-FAX directed to the proxy request device 101 (hereinafter, referred to as the proxy reception device information). The proxy reception device information is comprised of, e.g., proxy reception device destination information representing a destination of the proxy reception device and printing necessity/unnecessity setting information representing whether or not data received by the proxy reception device should be printed.

Figure 5:
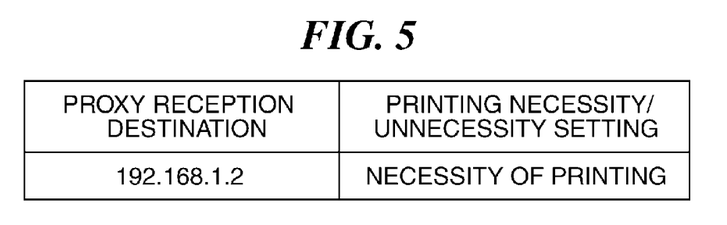
FIG. 5 is a view showing an example of proxy reception device information held in a proxy reception device information holding unit of the proxy request device.

FIG. 5 shows an example of proxy reception device information held in the proxy reception device information holding unit 405.

In the example shown in FIG. 5, proxy reception device information is stored in a table that is provided with a proxy reception destination field and a printing necessity/unnecessity setting field. An IP address "192.168.1.2" of the proxy reception device 102 is indicated in the proxy reception destination field, and information "necessity of printing" representing that proxy reception data should be printed by the proxy reception device 102 is indicated in the printing necessity/unnecessity setting field.

The proxy reception device information can be set in advance by the user, or can be acquired by searching for the proxy reception device 102, which is in a standby state, by service location protocol (SLP) multicast.

The proxy instruction transmitter unit 406 (proxy reception instruction unit and completion instruction unit) acquires proxy reception device information from the proxy reception device information holding unit 405, and based on the acquired device information, transmits to the proxy reception device 102 a proxy instruction message that includes an instruction for start or completion of proxy reception, the SIP URI of the proxy request device 101, and the printing necessity/unnecessity setting of proxy reception data.

The transfer request transmitter unit 407 (transfer request unit) instructs the proxy reception device 102 to transfer media data obtained by proxy reception, and transmits a transfer request message (transfer request information) containing the SIP URIs of the proxy request device 101 and transfer destination.

It should be noted that as formats of the proxy instruction message and transfer request message, a general-purpose protocol that expands a body part of a SIP-INFO method can be used or a unique protocol can be defined.

Figure 6:
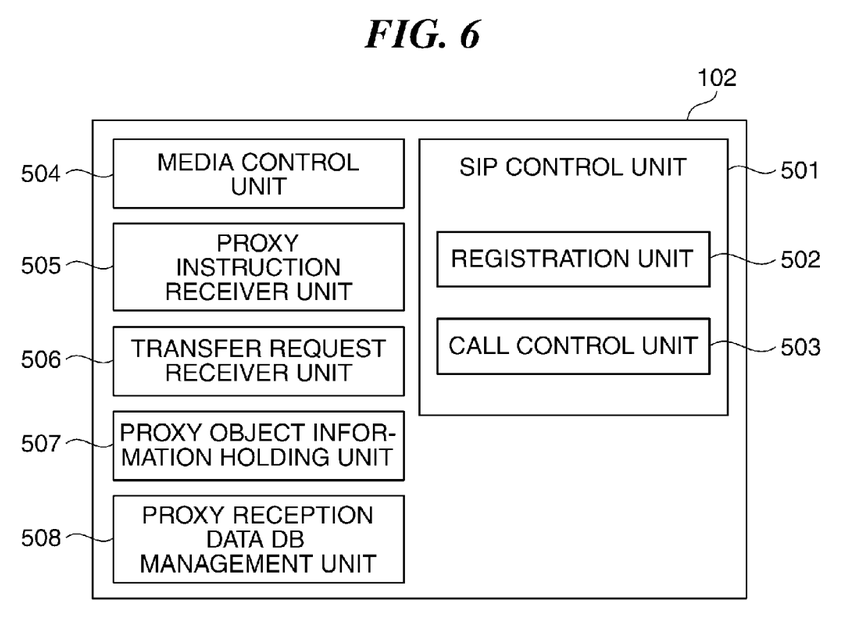
FIG. 6 is a functional block diagram showing a software structure of the proxy reception device.

FIG. 6 shows a software structure of the proxy reception device 102 in functional block diagram.

As shown in FIG. 6, the proxy reception device 102 includes a SIP control unit 501, media control unit 504, proxy instruction receiver unit 505, transfer request receiver unit 506, proxy object information holding unit 507, and proxy reception data DB (database) management unit 508. These elements 501 and 504 to 507 operate on the CPU 202 of the image forming apparatus 102.

The SIP control unit 501 includes a registration unit 502 that registers pairs of SIP URI and IP address into the call control server 103, and a call control unit 503 that controls a SIP session for IP-FAX.

The media control unit 504 controls transmission and reception of media data in IP-FAX, and where required, controls printing. The proxy instruction receiver unit 505 analyzes a proxy instruction message received from the proxy request device 101, and if the received proxy instruction message instructs start of proxy reception, stores into the proxy object information holding unit 507 proxy object information (e.g., SIP URI of the proxy request device and printing necessity/unnecessity setting for proxy reception data) contained in the proxy instruction message. On the other hand, if the received message instructs the completion of proxy reception, the proxy instruction receiver unit 505 deletes proxy object information corresponding to the message from the proxy object information holding unit 507.

Figure 7:
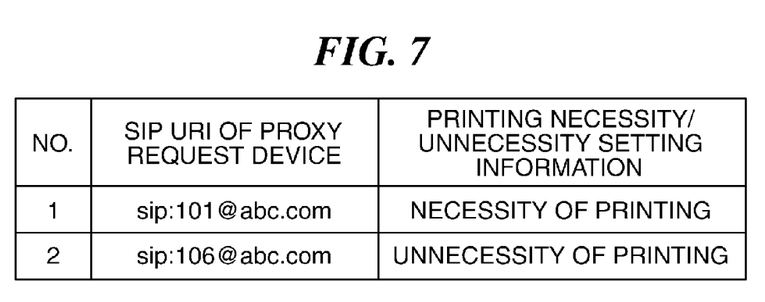
FIG. 7 is a view showing an example of proxy object information held in a proxy object information holding unit of the proxy reception device.

FIG. 7 shows an example of proxy object information held in the proxy object information holding unit 507.

As shown in FIG. 7, the information holding unit 507 (second holding unit) is stored with a table that has a plurality of lines in each of which proxy object information is held. In the illustrated example, the first line of the table is held with proxy object information associated with the proxy request device 101, i.e., the SIP URI ("sip:101@abc.com") of the proxy request device 101 and printing necessity/unnecessity setting information "necessity of printing". The second line of the table is held with proxy object information associated with a non-illustrated proxy request device other than the proxy request device 101, i.e., a SIP URI ("sip:106@abc.com") of the non-illustrated proxy request device and setting information "unnecessity of printing."

Referring to FIG. 6 again, the transfer request receiver unit (transfer unit) 506 analyzes a transfer request message received from the proxy request device 101. When receiving IP-FAX directed to the proxy request device 101 on behalf thereof, the transfer request receiver unit 506 performs processing for transferring proxy reception data to a SIP URI of the transfer destination specified in the transfer request message.

The proxy object information holding unit 507 holds proxy object information associated with at least one proxy request device, as previously described. The proxy reception data DB management unit 508 (record management unit) stores into the HDD 205 the proxy-received media data (proxy object data) and the SIP URI of destination of IP-FAX in association with each other.

It should be noted that in the above-described example, the image forming apparatuses 101, 102 are respectively used as the proxy request device and the proxy reception device. Alternatively, the image forming apparatus 101 can be configured to have the software structure shown in FIG. 6 for use as a proxy reception device, and the image forming apparatus 102 can be configured to have the software structure shown in FIG. 4 for use as a proxy request device.

Figure 8:
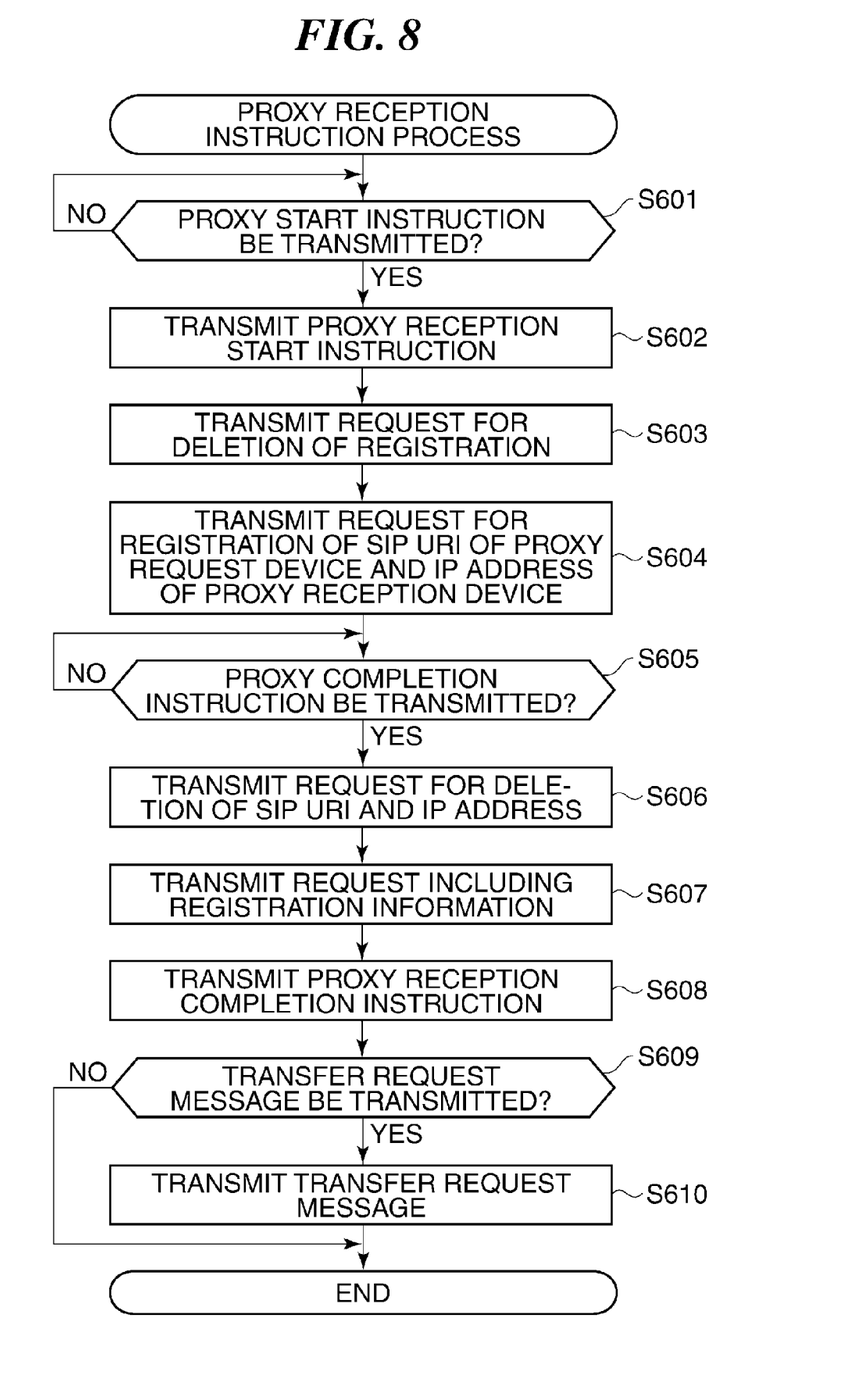
FIG. 8 is a flowchart showing a proxy reception instruction process performed by the proxy request device to instruct the proxy reception device to perform proxy reception.

FIG. 8 shows in flowchart a proxy reception instruction process performed by the proxy request device 101 to instruct the proxy reception device 102 to perform proxy reception. It should be noted that this process is performed by the CPU 202 of the proxy request device 101 by executing a program stored in the ROM 203.

At start of the proxy reception instruction process, the proxy instruction transmitter unit 406 of the proxy request device 101 determines whether or not a proxy start instruction should be transmitted to the proxy reception device 102 (step S601). For example, when processing for shift to the sleep state is started by the proxy request device 101, the proxy instruction transmitter unit 406 determines that the proxy start instruction should be transmitted.

If determined that the proxy start instruction should not be transmitted (NO to step S601), the proxy instruction transmitter unit 406 waits for, e.g., the proxy request device 101 to start the processing for shift to the sleep state. On the other hand, if determined that the proxy start instruction should be transmitted (YES to step S601), the transmitter unit 406 acquires from the proxy reception device information holding unit 405 proxy reception device information (in this example, it represents the proxy reception device 102) that has been read out from the HDD 205 and held in the information holding unit 405 at the start of the proxy request device 101.

Next, the transmitter unit 406 transmits the proxy reception start instruction (proxy reception instruction information) to the proxy reception device 102 through the network I/F control unit 209 (step S602).

Figure 9:
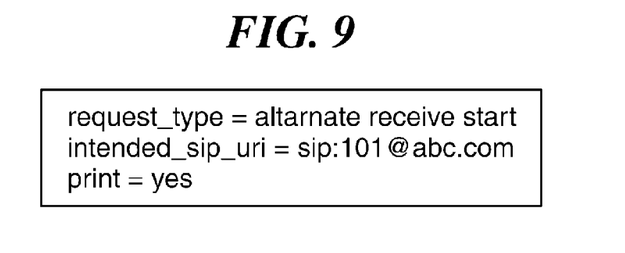
FIG. 9 is a view showing a body part of a SIP-INFO method for use by the proxy request device to instruct start of proxy reception.

FIG. 9 shows a body part (message body) of a SIP-INFO method for use by the proxy request device 101 to instruct start of proxy reception.

Referring to FIG. 9, the body part includes a "request_type" parameter in which an item requested in the SIP-INFO method is written. In the illustrated example, a word "alternate receive start" is written that represents a proxy reception start request.

The body part also includes an "intend_sip_uri" parameter in which a SIP URI of the proxy request device is specified. In the illustrated example, the SIP URI ("sip:101@abc.com") of the proxy request device 101 is indicated according to which proxy reception of IP-FAX directed to the proxy request device 101 is instructed.

The body part further includes a "print" parameter in which printing necessity/unnecessity setting information is written that represents whether or not media data of received IP-FAX should be printed. In the illustrated example, information "yes" representing that printing should be performed is specified according to which a printing instruction is given to the proxy reception device 102.

Next, in the proxy reception instruction process of FIG. 8, the registration unit 402 of the proxy request device 101 transmits to the call control server 103, through the network I/F control unit 209, a SIP request that instructs to delete registration of the proxy request device 101 (step S603). In response to the SIP request, the call control server 103 deletes the pair of the SIP URI and IP address of the proxy request device 101.

Next, the registration unit 402 transmits to the call control server 103, through the network I/F control unit 209, a SIP request for newly registering a pair of the SIP URI of the proxy request device 101 and the IP address of the proxy reception device 102 (step S604). In response to the SIP request, the call control server 103 registers new registration information.

Figure 10:
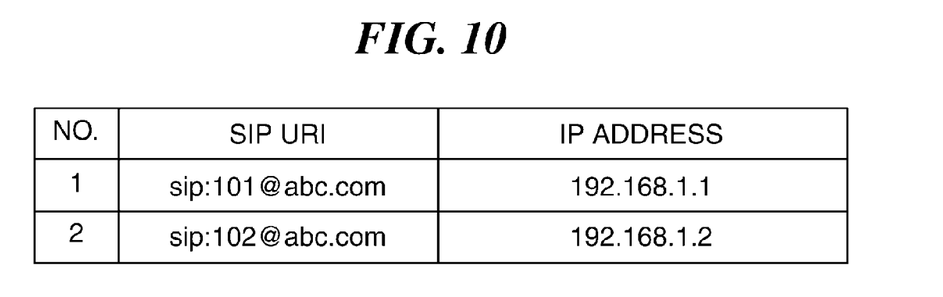
FIG. 10 is a view showing an example of registration information registered in the call control server.

FIG. 10 shows an example of registration information registered in the call control server 103.

As shown in FIG. 10, the call control server 103 is stored with a table that includes a plurality of lines registered with registration information in which a destination of proxy request device and a destination of proxy reception device are indicated in association with each other. In the illustrated example, the first line of the table is registered with the SIP URI ("sip:101@abc.com") and IP address "192.168.1.1" of the proxy request device 101, and the second line of the table is registered with the SIP URI ("sip:102@abc.com") and the IP address "192.168.1.2" of the proxy reception device 102. The destinations of the proxy request device 101 and proxy reception device 102 are associated with each other by the registration information registered in the table. The SIP proxy server 301 of the call control server 103 transfers to the proxy reception device 102 a SIP request directed to the SIP URI of the proxy request device 101.

Next, in the proxy reception instruction process of FIG. 8, the proxy instruction transmitter unit 406 of the proxy request device 101 determines whether or not a proxy completion instruction should be transmitted to the proxy reception device 102 (step S605). For example, when processing for shift from sleep state to standby state is started by the proxy request device 101, the proxy instruction transmitter unit 406 determines that the proxy completion instruction should be transmitted.

If determined that the proxy completion instruction should not be transmitted (NO to step S605), the proxy instruction transmitter unit 406 waits for, e.g., the proxy request device 101 starting the processing for shift to the standby state. On the other hand, if determined that the proxy completion instruction should be transmitted (YES to step S605), the transmitter unit 406 instructs the registration unit 402 to that effect, and the registration unit 402 transmits to the call control server 103, through the network I/F control unit 209, a SIP request that instructs deletion of registration.

Figure 11:
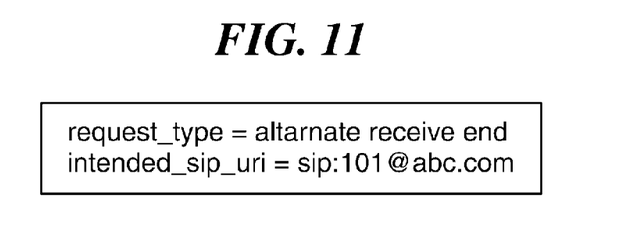
FIG. 11 is a view showing a body part of a SIP-INFO method for use by the proxy request device to instruct completion of proxy reception.

FIG. 11 shows a body part of a SIP-INFO method for use by the proxy request device 101 to instruct completion of proxy reception.

As shown in FIG. 11, a word "alternate receive end" that instructs completion of proxy reception is written in a "request_type" parameter of the body part, and the SIP URI ("sip:101@abc.com") of the proxy request device 101 is specified in an "intend_sip_uri" parameter.

When receiving the SIP request, the call control server 103 deletes the pair of the SIP URI of the proxy request device 101 and the IP address of the proxy reception device 102 (step S606).

Next, the registration unit 402 transmits to the call control server 103, through the network I/F control unit 209, a SIP request that includes registration information comprised of the pair of the SIP URI and IP address of the proxy request device 101 (step S607). In response to this SIP request, the call control server 103 registers the registration information.

Next, the proxy instruction transmitter unit 406 transmits a proxy reception completion instruction to the proxy reception device 102 via the network I/F control unit 209 (step S608). The transfer request transmitter unit 407 determines whether or not a transfer request message should be transmitted that requests the proxy reception device 102 to transfer IP-FAX obtained by proxy reception (step S609).

For example, when the printing necessity/unnecessity setting information, which is contained in the proxy reception device information held in the proxy reception device information holding unit 405, represents unnecessity of printing, the transfer request transmitter unit 407 determines that the transfer request message should be transmitted. It should be noted that it is possible to display a selection screen on the operation panel 214 and to enable a user to select on the selection screen whether or not the transfer request message should be transmitted.

If it is determined by the transfer request transmitter unit 407 that the transfer request message should not be transmitted (NO to step S609), the proxy reception instruction process is completed. On the other hand, if determined that the transfer request message should be transmitted (YES to step S609), the transmitter unit 407 transmits to the proxy reception device 102, via the network I/F control unit 209, a transfer request message that includes the SIP URI of transfer destination (step S610), whereupon the present process is completed. In response to the transfer request message, the proxy reception device 102 transmits an IP-FAX message to the transfer destination that is represented by the SIP URI of the transfer destination, as will be described later.

Figure 12:
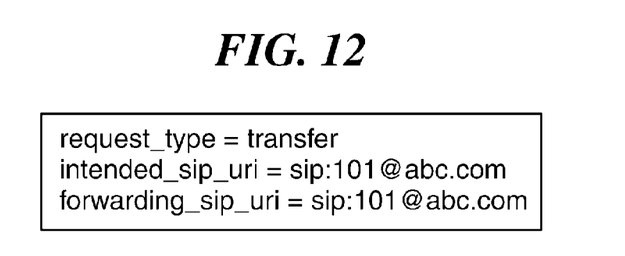
FIG. 12 is a view showing a body part of a SIP-INFO method for a transfer request message transmitted from the proxy request device.

FIG. 12 shows a body part of a SIP-INFO method for a transfer request message transmitted from the proxy request device 101.

As shown in FIG. 12, a word "transfer" that represents a transfer request is specified in a "request_type" parameter of the body part, and the SIP URI of the proxy request device 101 is specified in an "intend_sip_uri" parameter of the body part.

A transfer destination of IP-FAX media data obtained by proxy reception is specified in a "forwarding_sip_uri" parameter of the body part. In the illustrated example, the SIP URI ("sip:101@abc.com") of the proxy request device 101 is specified to specify transfer of IP-FAX media data obtained by proxy reception to the proxy request device 101.

Figure 13:
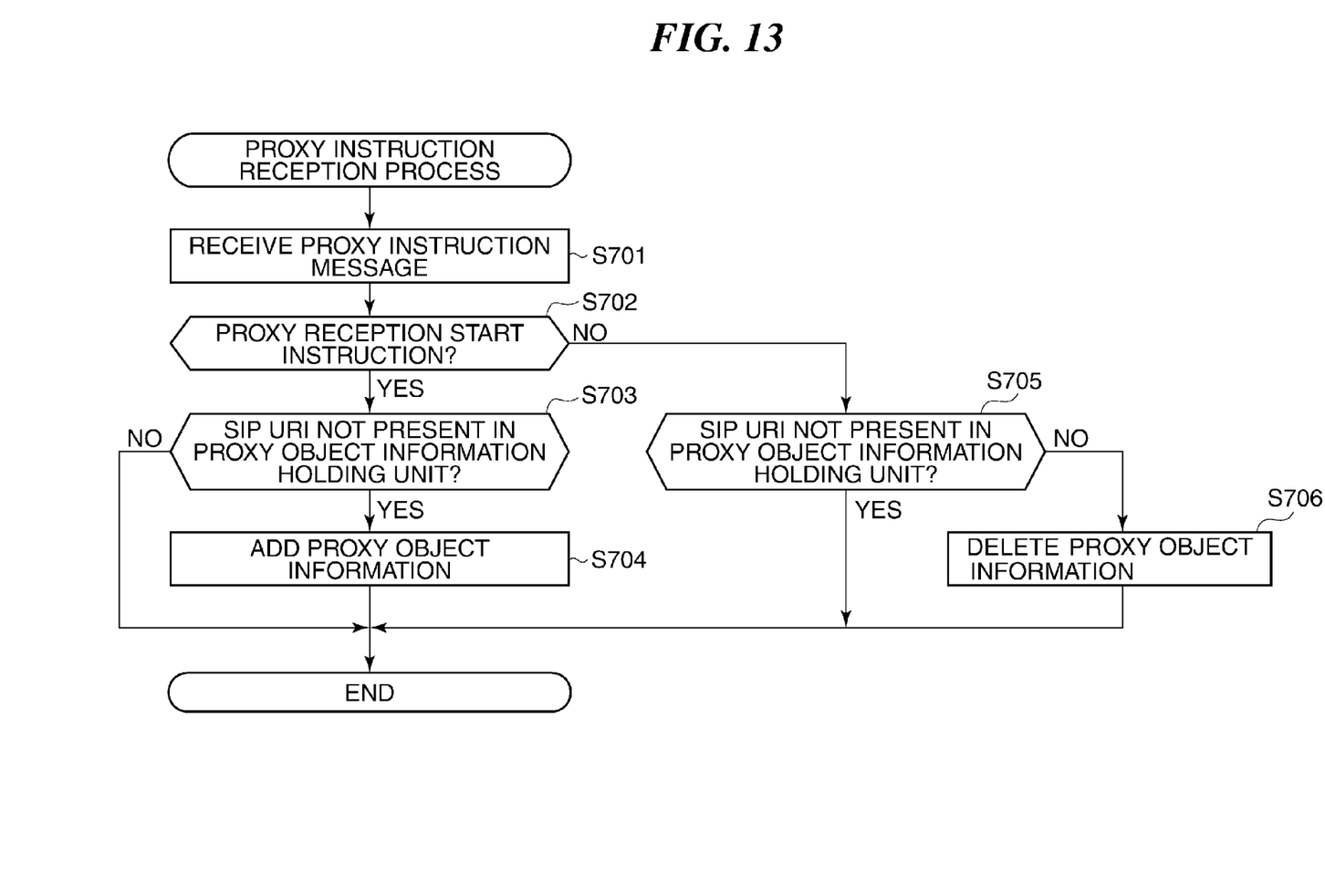
FIG. 13 is a flowchart showing a proxy instruction reception process performed by the proxy reception device.

FIG. 13 shows in flowchart a proxy instruction reception process performed by the proxy reception device 102. It should be noted that this process is performed by the CPU 202 of the proxy reception device 102 by executing a program stored in the ROM 203.

In the proxy instruction reception process, the network I/F control unit 209 of the proxy reception device 102 receives a proxy instruction message from the proxy request device 101 (step S701). The proxy instruction receiver unit 505 analyzes the proxy instruction message and determines whether or not the message is an instruction to start proxy reception (step S702).

If the proxy instruction message is an instruction to start proxy reception (YES to step S702), the proxy instruction receiver unit 505 determines whether or not the SIP URI of the proxy request device 101 contained in the message is not held in the proxy object information holding unit 507 (step S703).

If the SIP URI of the proxy request device 101 contained in the message is held in the information holding unit 507 (NO to step S703), the proxy instruction reception process is completed.

On the other hand, if the SIP URI of the proxy request device 101 contained in the message is not held in the information holding unit 507 (YES to step S703), the proxy instruction receiver unit 505 adds and stores the proxy object information (the SIP URI of the proxy request device 101 and printing necessity/unnecessity setting information) contained in the message into the information holding unit 507 (step S704), whereupon the proxy instruction reception process is completed.

If the proxy instruction message is not an instruction to start of proxy reception (NO to step S702), i.e., if the proxy instruction message is an instruction for completion of proxy reception, the proxy instruction receiver unit 505 determines whether or not the SIP URI of the proxy request device 101 contained in the received proxy instruction message is not held in the proxy object information holding unit 507 (step S705).

If the SIP URI of the proxy request device 101 contained in the message is not held in the information holding unit 507 (YES to step S705), the proxy instruction reception process is completed. On the other hand, if the SIP URI of the proxy request device 101 contained in the message is held in the information holding unit 507 (NO to step S705), the proxy instruction receiver unit 505 deletes proxy object information, which corresponds to the SIP URI of the proxy request device 101, from the information holding unit 507 (step S706), whereupon the proxy instruction reception process is completed.

As described above, when a request for proxy reception is received from the proxy request device 101, the proxy reception device 102 receives IP-FAX directed to the proxy request device 101, and the proxy reception data DB management unit 508 of the proxy reception device 102 stores media data (reception data) of IP-FAX into, e.g., the HDD 205 of the proxy reception device 102.

Figure 14:
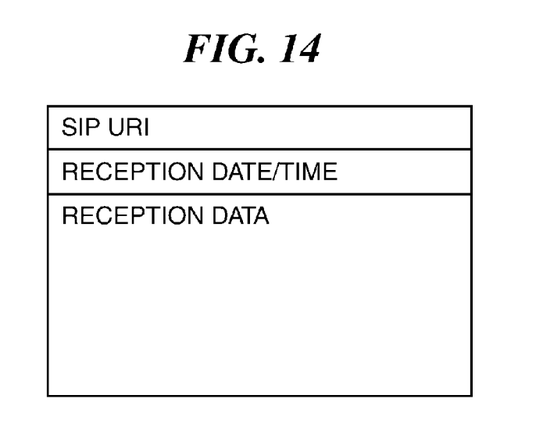
FIG. 14 is a view showing an example storage format in which media data that is obtained by proxy reception of IP-FAX by the proxy reception device is stored into an HDD.

FIG. 14 shows an example storage format in which media data that is obtained by proxy reception of IP-FAX by the proxy reception device 102 is stored into the HDD 205.

As shown in FIG. 14, the storage format has a data area stored with media data (reception data) obtained by proxy reception of IP-FAX, a SIP URI area stored with a SIP URI that represents a destination of IP-FAX, and a supplemental information area stored with reception date/time data.

Figure 15:
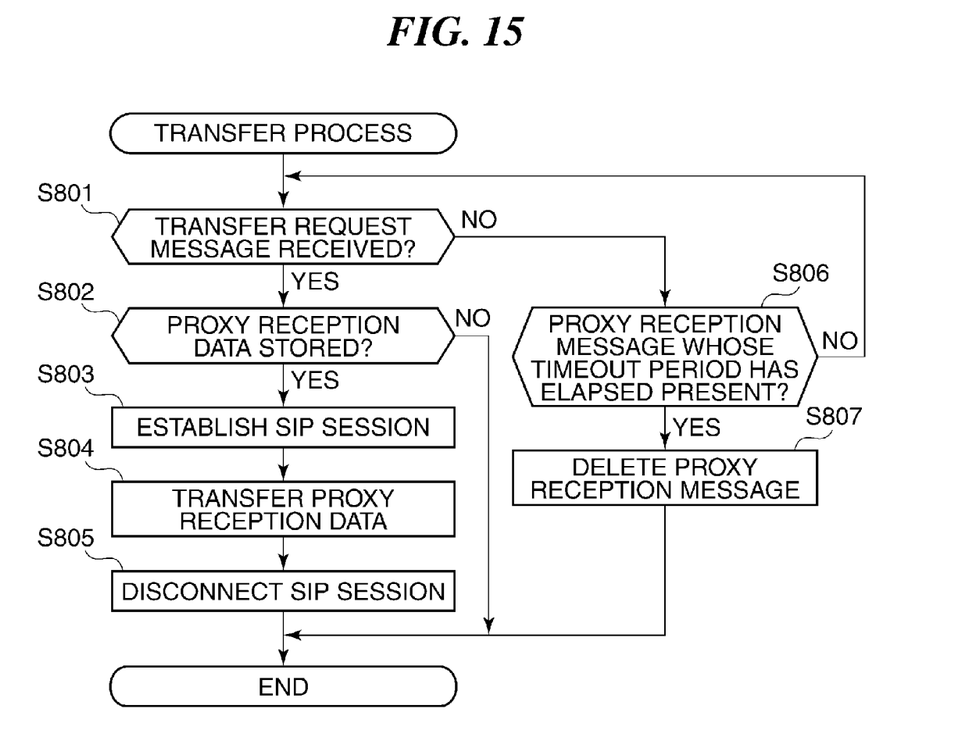
FIG. 15 is a flowchart showing a transfer process performed by the proxy reception device.

FIG. 15 shows in flowchart a transfer process performed by the proxy reception device 102. The transfer process is performed by the CPU 202 of the proxy reception device 102 by executing a program stored in the ROM 203.

At start of the transfer process, the transfer request receiver unit 506 of the proxy reception device 102 determines whether or not a transfer request message is received from the proxy request device 101 via the network I/F control unit 209 (step S801).

If a transfer request message is received from the proxy request device 101 (YES to step S801), the transfer request receiver unit 506 analyzes the transfer request message to acquire the SIP URI of the proxy request device 101, and inquires the proxy reception data DB management unit 508 about whether or not IP-FAX directed to the SIP URI of the proxy request device 101 is proxy-received.

The DB management unit 508 confirms whether or not proxy reception data associated with the SIP URI is stored in the HDD 205 (step S802). If the proxy reception data is not stored in the HDD 205 (NO to step S802), the DB management unit 508 notifies the transfer request receiver unit 506 to that effect, and the transfer process is completed. If the proxy reception data is stored in the HDD 205 (YES to step S802), the DB management unit 508 reads out the proxy reception data from the HDD 205 and sends it to the transfer request receiver unit 506.

When receiving the proxy reception data, the transfer request receiver unit 506 analyzes the transfer request message, and acquires the SIP URI of the transfer destination and sends it to the call control unit 503. The call control unit 503 establishes a SIP session with the SIP URI of the transfer destination (step S803), and sends the proxy reception data to the media control unit 504.

The media control unit 504 transfers the proxy reception data via the network I/F control unit 209 by using the established SIP session (step S804). Upon completion of transfer of the proxy reception data, the call control unit 503 disconnects the SIP session (step S805), whereby the transfer process is completed.

If a transfer request message is not received from the proxy request device 101 (NO to step S801), i.e., if an inquiry is not received from the transfer request receiver unit 506, the proxy reception data DB management unit 508 checks whether or not a proxy reception message whose timeout period has elapsed from the completion of proxy reception is present in the HDD 205 (step S806).

If a proxy reception message whose timeout period has elapsed is not present in the HDD 205 (NO to step S806), the DB management unit 508 notifies the transfer request receiver unit 506 to that effect, and the flow returns to step S801.

If a proxy reception message whose timeout period has elapsed is present in the HDD 205 (YES to step S806), the DB management unit 508 deletes the proxy reception message (media data) from the HDD 205 (step S807), and notifies the transfer request receiver unit 506 to that effect, whereupon the transfer process is completed.

Figure 16:
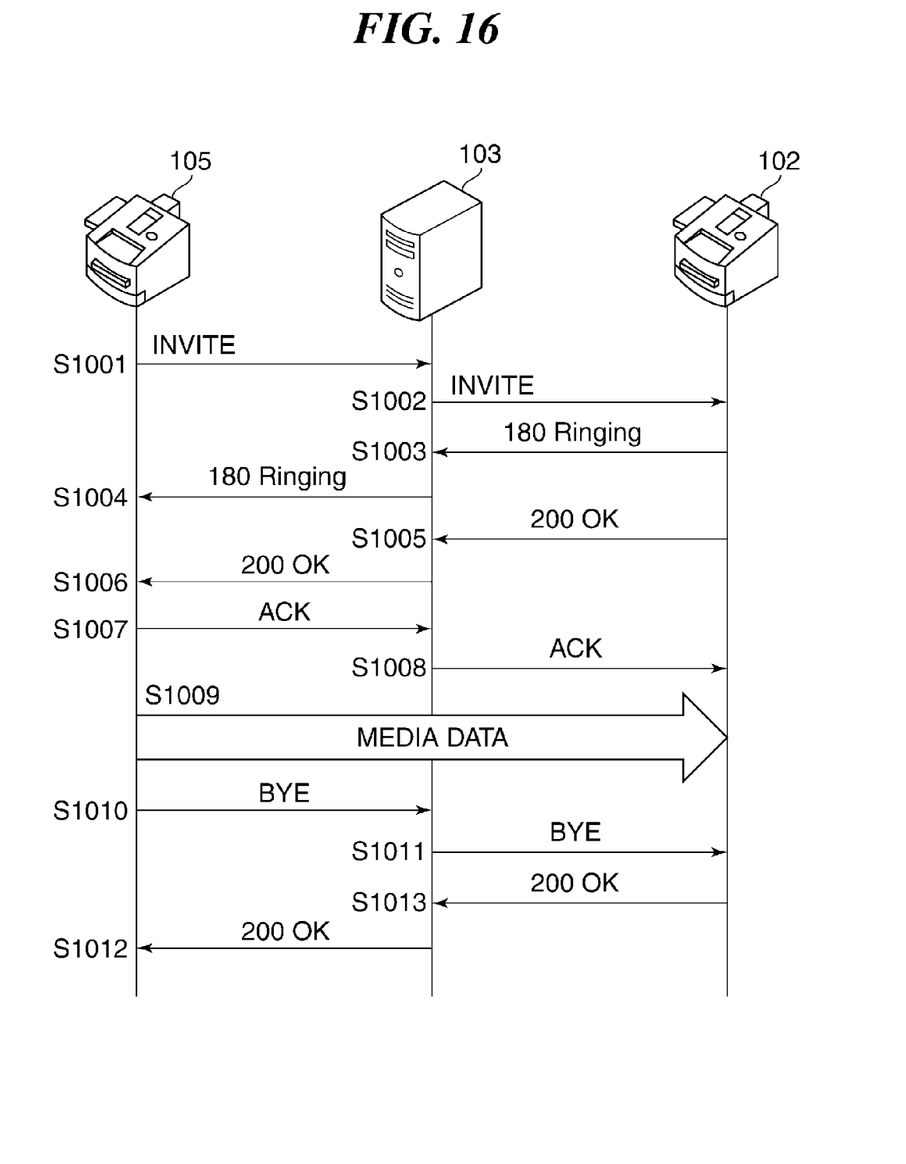
FIG. 16 is a sequence diagram showing proxy reception of IP-FAX communication from the FAX to the proxy request device, which is performed by the proxy reception device.

FIG. 16 shows, in sequence diagram, proxy reception of IP-FAX communication from the FAX 105 to the proxy request device 101, which is performed by the proxy reception device 102.

To perform IP-FAX communication from the FAX 105 to the proxy request device 101, the FAX 105 transmits a connection request INVITE (session establishment request) to the call control server 103, while specifying, as destination, the SIP URI ("sip:101@abc.com") of the proxy request device 101 (S1001).

In the call control server 103, the location server 303 is registered with the SIP URI of the proxy request device 101 and the IP address of the proxy reception device 102 in pairs, and the proxy server 301 transfers the connection request INVITE to the proxy reception device 102 whose IP address is "192.168.1.2" (S1002).

When receiving the connection request INVITE, the proxy reception device 102 sends a response "180 Ringing" back to the call control server 103 in reply to the connection request (S1003). The call control server 103 transmits the response "180 Ringing" to the FAX 105 (S1004).

Next, the proxy reception device 102 accepts the received connection request INVITE and sends a permission response "200 OK" allowing SIP session establishment back to the call control server 103 (S1005). The call control server 103 transmits the permission response "200 OK" to the FAX 105 (S1006).

When receiving the permission response "200 OK," the FAX 105 transmits an affirmative request ACK to the call control server 103 (S1007). The server 103 sends the affirmative request ACK to the proxy reception device 102 (S1008), whereby a SIP session is established between the FAX 105 and the proxy reception device 102.

The FAX 105 transmits media data to the proxy reception device 102 through the call control server 103 by IP-FAX using the established SIP session (S1009). Upon completion of transmission of media data, the FAX 105 transmits a disconnection request BYE to the call control server 103 (S1010). The server 103 transmits the disconnection request BYE to the proxy reception device 102 (S1011).

When receiving the disconnection request BYE, the proxy reception device 102 sends a permission response "200 OK" back to the call control server 103. The server 103 transmits the permission response "200 OK" to the FAX 105 (S1012), whereby the SIP session is disconnected.

Figure 17:
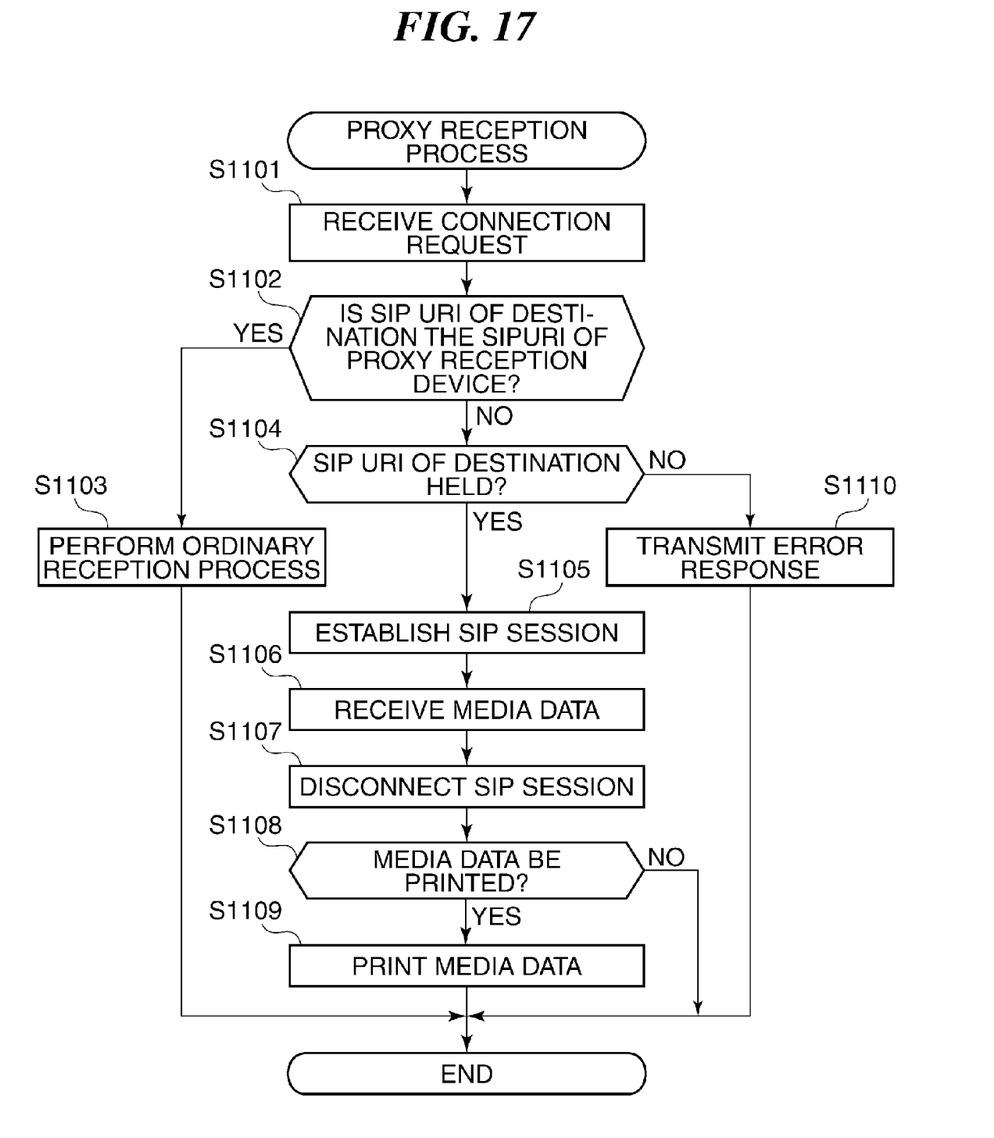
FIG. 17 is a flowchart showing a proxy reception process performed by the proxy reception device to perform proxy reception of IP-FAX.

FIG. 17 shows in flowchart a proxy reception process performed by the proxy reception device 102 to perform proxy reception of IP-FAX. This process is performed by the CPU 202 of the proxy reception device 102 by executing a program stored in the ROM 203.

In the proxy reception process, the proxy reception device 102 receives a connection request INVITE transmitted from the FAX 105 (step S1101), and sends a response "180 Ringing" back to the FAX 105 via the call control server 103 in reply to the connection request INVITE.

The call control unit 503 of the proxy reception device 102 determines whether or not the SIP URI of the destination contained in the connection request INVITE is the SIP URI of the proxy reception device 102 (step S1102). If the SIP URI of the destination is the SIP URI of the proxy reception device 102 (YES to step S1102), the call control unit 503 causes the media control unit 504 to perform an ordinary IP-FAX reception process (step S1103), and the proxy reception process is completed.

If the SIP URI of the destination contained in the connection request INVITE is not the SIP URI of the proxy reception device 102 (NO to step S1102), the call control unit 503 inquires of the proxy object information holding unit 507 about whether the SIP URI of destination of the connection request INVITE is held in the information holding unit 507 (step S1104).

If the SIP URI of the destination is not held in the information holding unit 507 (NO to S1104), the call control unit 503 sends back an error response in reply to the connection request INVITE (step S1110), and the reception process is completed. On the other hand, if the SIP URI of destination is held in the information holding unit 507 (YES to S1104), the call control unit 503 establishes a SIP session (step S1105).

To establish the SIP session, the call control unit 503 sends a permission response "200 OK" back to the FAX 105 via the call control server 103 in reply to the connection request INVITE. When receiving an affirmative request ACK from the FAX 105 in reply to the permission response "200 OK," the call control unit 503 establishes the SIP session and notifies the media control unit 504 to that effect. The media control unit 504 receives media data of IP-FAX from the FAX 105 (step S1106), and upon completion of reception of the media data, notifies the call control unit 503 to that effect.

The media control unit 504 sends the received media data to the proxy reception data DB management unit 508. The DB management unit 508 stores into the HDD 205 the media data and the SIP URI of the destination of the connection request INVITE in association with each other.

Next, when receiving a disconnection request BYE transmitted from the FAX 105, the call control unit 503 sends a permission response "200 OK" back to the FAX 105, and disconnects the SIP session (step S1107).

Then, based on the printing necessity/unnecessity setting information contained in the proxy object information held in the proxy object information holding unit 507, the media control unit 504 determines whether or not the media data should be printed (step S1108).

If the setting information "necessity of printing" (printing instruction information) is contained in the proxy object information, the media control unit 504 determines that the media data should be printed. In that case (YES to step S1108), the media control unit 504 sends the media data to the printer 212 via the printer I/F control unit 206. The printer 212 prints the media data (step S1109). Then, the proxy reception device 102 completes the proxy reception process.

If the setting information "unnecessity of printing" is contained in the proxy object information held in the proxy object information holding unit 507 and the printing of media data is unnecessary (NO to step S1108), the proxy reception process is completed.

As described above, in this embodiment, the registration information of the proxy request device is registered by the proxy request device into the call control server, and according to the registration information the proxy reception instruction is notified to the proxy reception device. Accordingly, when proxy reception of IP-FAX is performed by the proxy reception device, a SIP session is established without being refused by the proxy reception device. It is therefore possible for the proxy reception device to perform proxy reception of data directed to the proxy request device, without using a management unit that manages a plurality of communication devices.

As apparent from the foregoing description, the CPU 202, printer I/F control unit 206, and printer 212 function as a printing unit of this invention defined in the appended claims. Although a case has been described where image forming apparatuses are used as communication devices in the embodiment, this invention is also applicable to information processing apparatuses having a communication function such as a computer or the like.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2012-031569, filed Feb. 16, 2012, which is hereby incorporated by reference herein in its entirety.

What is claimed is:

1. A proxy request device communicable with a call controller that is connected to a network, comprising:
   a holding unit configured to hold an IP address of a proxy reception device that performs proxy reception of data directed to the proxy request device;
   a registration unit configured to delete a pair of a SIP URI of the proxy request device and the IP address of the proxy request device from a call controller before registering a pair of the IP address of the proxy reception device and a SIP URI of the proxy request device into the call controller; and
   a proxy reception instruction unit configured to instruct the proxy reception device to perform the proxy reception.

2. The proxy request device according to claim 1, wherein when receiving a session establishment request directed to the destination of the proxy request device, the call controller establishes a session with the proxy reception device according to the registration information by using a SIP protocol.

3. The proxy request device according to claim 2, wherein the proxy reception instruction information includes the proxy request device destination information, and
   the proxy reception device includes a second holding unit configured to hold the proxy request device destination information, a call control unit configured to establish the session in a case where the proxy request device destination information is held in the second holding unit when the session establishment request is received, and
   a record management unit configured, when receiving through the call controller the data transmitted to the destination of the proxy request device, to record proxy object data that is comprised of the data transmitted to the destination of the proxy request device and the proxy request device destination information associated therewith.

4. The proxy request device according to claim 3, further including:
   a transfer request unit configured to send, to the proxy reception device, transfer request information that requests transfer of the proxy object data received by the proxy reception device to the destination of proxy request device that is represented by the proxy request device destination information contained in the proxy object data.

5. The proxy request device according to claim 4, wherein the transfer request information includes the proxy request device destination information, and
   the proxy reception device includes a transfer unit configured to transfer the proxy object data that includes the proxy request device destination information contained in the transfer request information to the destination of the proxy request device that is represented by the proxy request device destination information.

6. The proxy request device according to claim 1, further including:
   a completion instruction unit configured to instruct the proxy reception device to complete proxy reception,
   wherein the registration unit deletes the registration information from the call controller and registers the SIP URI and the IP address of the proxy request device into the call controller before the completion instruction unit instructs the proxy reception device to complete the proxy reception.

7. The proxy request device according to claim 1, wherein the proxy reception device has a printing unit that prints the proxy object data, and
   the printing unit prints the proxy object data in a case where the proxy reception instruction information is added with printing instruction information that instructs printing.

8. The proxy request device according to claim 1, wherein the data transmitted to the destination of the proxy request device is T.38 protocol-based facsimile data.

9. A control method for a proxy request device communicable with a call controller that is connected to a network, the method comprising:
   holding an IP address of a proxy reception device that performs proxy reception of data directed to the proxy request device;
   deleting a pair of a SIP URI of the proxy request device and the IP address of the proxy request device from a call controller;
   after the deleting, registering, into the call controller, a pair of the IP address of the proxy reception device and a SIP URI of the proxy request device; and instructing the proxy reception device to perform proxy reception.

10. A non-transitory computer-readable storage medium storing a program for causing a computer to execute a control method for a proxy request device communicable with a call controller that is connected to a network, the method comprising:
  holding an IP address of a proxy reception device that performs proxy reception of data directed to the proxy request device;
  deleting a pair of a SIP URI of the proxy request device and the IP address of the proxy request device from a call controller;
  after the deleting, registering, into the call controller, a pair of the IP address of the proxy reception device and a SIP URI of the proxy request device; and
  instructing the proxy reception device to perform proxy reception.

* * * * *